United States Patent [19]
Ishihara et al.

[11] Patent Number: 6,090,500
[45] Date of Patent: Jul. 18, 2000

[54] OXIDE ION MIXED CONDUCTIVE SUBSTANCE AND USES THEREOF

[75] Inventors: Tatsumi Ishihara; Yusaku Takita, both of Oita, Japan

[73] Assignees: Mitsubishi Materials Corporation, Tokyo; Tatsumi Ishihara; Yusaka Takita, both of Oita, all of Japan

[21] Appl. No.: 09/144,218

[22] Filed: Aug. 31, 1998

[30] Foreign Application Priority Data

Aug. 29, 1997 [JP] Japan ..................................... 9-234839
Mar. 27, 1998 [JP] Japan ................................... 10-081184

[51] Int. Cl.⁷ ..................................................... H01M 8/10
[52] U.S. Cl. ................................. 429/33; 429/30; 429/40; 429/41; 429/218.2; 501/123; 501/126; 501/152; 96/4; 96/6; 252/519.1; 252/521.1; 252/521.2; 427/77; 427/115; 204/295
[58] Field of Search ................................... 429/30, 33, 40, 429/41, 218.2; 427/115, 77; 96/4, 6; 204/295; 501/123, 126, 152; 264/618, 681; 252/519.1, 521.1, 521.2

[56] References Cited

PUBLICATIONS

Solid State Ionics 70/71 (1994) 234–238, "Improved oxygen ion conductivity of $NdAlO_3$ perovskite–type oxide by doping with Ga"; Hideaki Matsuda, et al. No Month Available.
Solid State Ionics; 86–88 (1996) 197–201; "Oxide ion conductivity in doped Ga based perovskite type oxide"; Tatsumi Ishihara, et al. No Month Available.
J. Electrochem. Soc., vol. 141, No. 12, Dec. 1994; "Oxide Ion Conductivity in Doped $NdAlO_3$ Perovskite–Type Oxides", Tatsumi Ishihara, et al.

*Primary Examiner*—Bruce F. Bell
*Attorney, Agent, or Firm*—Oblon, Spivak, McClelland, Maier & Neustadt, P.C.

[57] ABSTRACT

An oxide ion mixed conductive substance has the formula of $A_{1-x}Ca_xGa_{1-y}B_y$ oxide, wherein A is at least one lanthanoid element having a trivalent octacoordinated ion radius of 1.05 to 1.15 Å, B is at least one element selected from the group consisting of Co, Fe, Ni and Cu, x is 0.05 to 0.3, y is 0.05 to 0.3. The oxide ion mixed conductive substance has the perovskite structure.

27 Claims, 6 Drawing Sheets

OXIDE ION MIXED CONDUCTIVE SUBSTANCE AND USES THEREOF

BACKGROUND OF THE INVENTION

1. Field of the Invention

The present invention relates to a novel rare earth gallate based oxide ion mixed conductive substance having a perovskite type structure. This oxide ion mixed conductive substance shows a very high electron-ion mixed conductivity and is useful as an electrode (air electrode) for a fuel cell and a gas separation membrane, such as an air separation membrane.

2. Discussion of the Background

A substance which conducts both electronically charged particles (electrons or holes) and ionically charged particles (positive or negative ions) is called a mixed conductive substance. When the electronic conductivity of such a material is expressed as $\sigma_e$ and the ionic conductivity is expressed as $\sigma_i$, a value $\sigma_i/((\sigma_e + \sigma_i)$, is the ion transference number, and a value $\sigma_e/(\sigma_e + \sigma_i)$, is the electron transference number. They are, respectively, the proportion of electric conduction which is ionic conduction and electronic conduction. In a typical mixed conductive substance, the ion transference number is comparable to the electron transference number (i.e., each value is about 0.5).

Mixed conductive substances are classified roughly into alkaline ion mixed conductive substances, proton mixed conductive substances and oxide ion mixed conductive substances depending on the type of ions contributing to electric conduction. A large part of the positive active materials of a cell are mixed conductive substances, particularly an alkaline ion mixed conductive substance or a proton mixed conductive substance. For example, a large part of the cathode materials of a lithium ion secondary cell is an alkaline ion mixed conductive substance. Furthermore, proton mixed conductive substances include substances which are colored by a diffusion reaction of protons, and they are used as display elements.

In contrast, excellent oxide ion mixed conductive substances in which the ionic charge carrier is an oxide ion ($O^{2-}$) are scarce. It is known, for example, that $CeO_2$, present as a solid solution with $Y_2O_3$, $Cd_2O_3$ or $CaO$, is an oxide ion conductive substance in an oxidative atmosphere, but reveals n type electronic conduction by the reduction of $Ce^{4+} \rightarrow Ce^{3+}$ in a reductive atmosphere; the ion transference number is reduced and the material becomes a mixed conductive substance. This material has been investigated for use as a fuel electrode (anode) of a solid oxide fuel cell (SOFC), making use of this property. However, this material suffers from the problem that the crystal lattice volume changes to a large extent depending on the atmosphere.

Materials showing a mixed conductivity in a reductive atmosphere are known, but materials showing excellent mixed conductivity in an oxidative atmosphere have so far scarcely been known. If such materials were available, they would be useful as an air electrode (cathode) of a solid oxide fuel cell.

An air electrode of a solid oxide fuel cell should be composed of materials which are chemically stable at high temperatures in an atmosphere with an oxygen partial pressure higher than about $10^{-15}$ to $10^{-10}$ atmospheric pressure and which show high electronic conduction. Metals cannot be used, and therefore perovskite type oxides exhibiting electronic conduction have been used. $LaMnO_3$ or $LaCoO_3$ in which alkaline earth metals, such as Sr, Ca and Mg, are doped into the A site, have mainly been used for conventional air electrodes. These materials principally show electronic conduction, and have only a very small amount of ionic conduction. Accordingly, as described later, the electrode reaction is restricted to the vicinity of the interface between the three phases: the air electrode, the electrolyte and the air; and polarization in the air electrode becomes large, causing a reduction in the output of the cell.

SUMMARY OF THE INVENTION

An object of the present invention is to provide an oxide ion mixed conductive substance which shows good electron-oxide ion mixed conductivity over a wide oxygen partial pressure range, from a reductive atmosphere to an oxidative atmosphere, and a wide temperature range, from 600° C. or lower to 1000° C. or higher, and which also has a high electric conductivity and a small temperature change thereof, and has excellent performance.

During research of perovskite type oxide ion mixed conductive substances, the present inventors discovered that certain types of rare earth gallate based perovskite materials exhibited a very high electric conductivity, compared with other similar materials, over a wide temperature range. The present inventors also discovered that the ionic conductivity of these materials is comparable to the electronic conductivity in a wide temperature range.

The present invention includes a perovskite type oxide ion mixed conductive substance having a composition represented by the following formula (a):

$$A_{1-x}Ca_xGa_{1-y}B_yO_{3-z} \quad\quad (a)$$

wherein A is at least one lanthanoid metal in which the trivalent ion has an octacoordinated ion radius of 1.05 to 1.15 Å; B is at least one of Co, Fe, Ni and Cu; x is 0.05 to 0.3; y is 0.05 to 0.3; and z corresponds to the number of oxygen holes in the structure. This material may also be referred to as $A_{1-x}Ca_xGa_{1-y}B_y$ oxide.

In the present invention, the phrase "oxide ion mixed conductive substance" means a material in which both electronic conduction and ionic conduction participates in the electric conductivity. Preferred as the oxide ion mixed conductive substances are materials in which an ion transference number (proportion of ionic conduction) of the electric conductivity falls preferably in a range of 0.1 to 0.7, particularly preferably 0.2 to 0.6.

Furthermore, the present invention also provides a solid oxide fuel cell containing the oxide ion mixed conductive substance described above in an air electrode, as well as a gas separation membrane comprising this oxide ion mixed conductive substance.

DETAILED DESCRIPTION OF THE INVENTION

Figure 1:
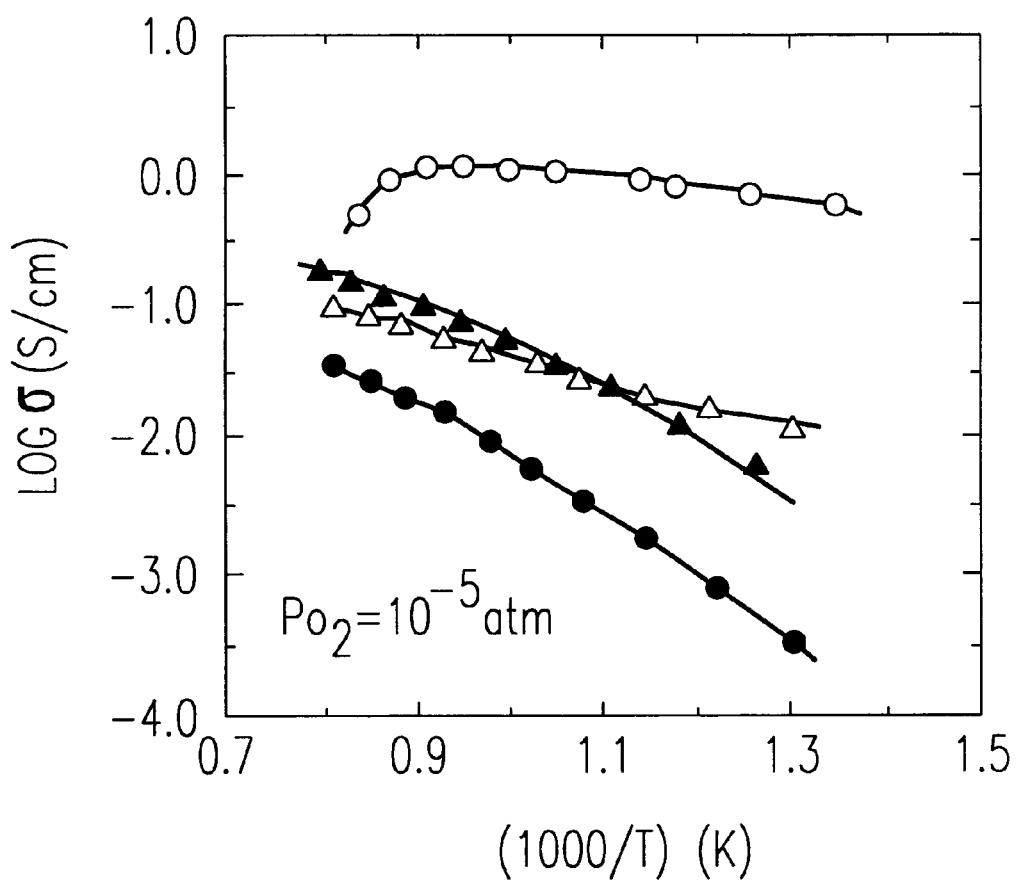
FIG. 1 is a graph showing temperature vs. electric conductivities of the oxide ion mixed conductive substances of the present invention and similar materials, which were determined at an oxygen partial pressure of $10^{-5}$ atm.

The oxide ion mixed conductive substance of the present invention has a perovskite type crystal structure, wherein the A atoms shown in formula (a) and Ca atoms occupy the A site of the perovskite structure represented by $ABO_3$, and Ga atoms and B atoms occupy the B site. Among both A and B sites which are typically occupied by trivalent metals, a portion of the A sites are occupied by Ca atoms which is a divalent metal, and a portion of the B sites are occupied by a transition metal which may be either divalent or trivalent, thereby forming an oxygen hole. This oxygen hole brings about the oxide ion conductivity. Accordingly, the number of oxygen atoms decreases by portion of this oxygen hole.

The maximum number of oxygen atoms theoretically is 3 in the formula (a), but it is actually 3 or less. The number of the oxygen holes in the above formula is 0.3 at the maximum, and therefore the actual number of oxygen atoms falls in a range of 2.7 to 3; z is 0 to 0.3. However, the number of the oxygen holes depends not only on the type of dopant atoms, but also the temperature, the oxygen partial pressure and the type and amount of B atoms. Therefore, the number of oxygen holes at any moment is dependent on temperature and oxygen partial pressure, and is not a fixed number.

In the formula (a), A is a lanthanoid based rare earth metal in which the trivalent ion has an octacoordinated ion radius of 1.05 to 1.15 Å, and B is a transition metal. Therefore, the oxide ion mixed conductive substance of the present invention is a quaternary (A+Ca+Ga+B) composite oxide having the perovskite structure, and which corresponds to lanthanoid gallate ($AGaO_3$) which is doped Ca atoms into the A site, and a specific transition metal (B atoms) into the B site. Hereinafter, this compound oxide may be called a quaternary compound oxide.

Examples of the A atoms (that is, the lanthanoid based rare earth metal in which the trivalent ion has an octacoordinated ion radius of 1.05 to 1.15 Å) in the formula (a) described above include Nd (1.1 1 Å), Pr (1.13 Å), Sm (1.08 Å), Ce (1.14 Å), Eu (1.07 Å) and Gd (1.05 Å) (the numbers shown in the parentheses are octacoordinated ion radii of these trivalent ions). La has a large octacoordinated ion radius ($La^{3+}$) of 1.16 Å and therefore cannot be used in the present invention. The preferred A atoms are at least one of Nd, Pr and Sm, and Nd is particularly preferred.

In the perovskite type compound oxide of the present invention, the A atoms occupying the A site have a relatively small ion radius, and therefore Ca atoms, having an ion radius which is relatively close to the ion radius of the A atoms may be present as doping atoms for the A site. Mg, which is homologous to Ca, but has a smaller ion radius than Ca, preferentially occupies the B site, not the A site, in rare earth based perovskites. Sr which is also homologous to Ca, but has a larger ion radius than Ca, is unstable in a crystal structure of the resulting perovskite, unless the A atoms have a large ion radius, such as the large ion radius of La.

Atoms occupying the B site of the perovskite type compound oxide of the present invention include Ga, and a transition metal selected from Co, Fe, Ni and Cu as doping atoms. As described above, Mg has an ion radius close thereto and can be used as doping atoms for Ga atoms occupying the B site, but the resulting perovskite type quaternary compound oxide has a very reduced electronic conductivity. That is, only when lanthanoid metals having the ion radius described above, are used in combination with a Ca dopant at the A site, and Ga is used in combination with a transition metal dopant at the B site, does the perovskite material show excellent electron-ion mixed conductivity according to the present invention.

Shown in FIG. 1 is the temperature dependence of the electric conductivities of four quaternary perovskite type compound oxides each having the composition $A_{0.9}M_{0.1}Ga_{0.9}B_{0.1}O_{3-z}$, in which A is La or Nd; when A is La, M is Sr; and when A is Nd, M is Ca, and B is Mg or Co. As can be found from this graph, in the case of $La_{0.9}Sr_{0.1}Ga_{0.9}B_{0.1}O_{3-z}$ (A is La and M is Sr), even if the B atoms are either Mg or Co (▲ and Δ, respectively), the electric conductivity is almost the same value, and the effect of temperature changes are similar, though a little different on the low temperature side. That is, the conductivities stand at the same level even if the B atoms are changed.

In contrast, in the case of $Nd_{0.9}Ca_{0.1}Ga_{0.9}B_{0.1}O_{3-z}$, (A is Nd and M is Ca), when the B atoms are Mg (●), the material has a lower electric conductivity than the La based material described above. On the other hand, in the case of a material in which the B atoms are Co (○), the material shows a very high electric conductivity, as compared with the La based material described above. Therefore, in this case, a marked difference is produced between the conductivities, depending on whether the B atoms are Mg or Co. Only when the B atoms are Co (that is, in the present invention), the material shows a particularly high conductivity, and the high electric conductivity, exceeding 1 $Scm^{-1}$ which cannot be obtained from other materials, can be obtained depending on the temperature.

In addition, the effect of temperature changes on the electric conductivities is completely different. When the B atoms are Mg (●), the lower the temperature, the more the conductivity is reduced, which is common to materials showing ionic conductivity, and the rates of decrease are considerably large (order of two figures). On the other hand, in the case of the quaternary compound oxide (○) according to the present invention in which the B atoms are Co, the conductivity increases when the temperature is lowered, and decreases when the temperature is further lowered. However, the reduction in conductivity is very small and remains of the same order. It is apparent from this graph that only $Nd_{0.9}Ca_{0.1}Ga_{0.9}Co_{0.1}O_{3-z}$ of the compounds tested, shown by ○, has this singular behavior.

In ionic conductive materials, conductivity depends largely on temperature in many cases, and is usually reduced as the temperature is reduced. Accordingly, it appears that not only is the ionic conduction caused by oxide ions, but also the electronic conduction contributes considerably to the conductivity of the perovskite type materials of the present invention. In order to confirm this, the ion transference numbers (proportion of ionic conduction sharing in electric conductivity) of the quaternary compound oxides $Nd_{0.9}Ca_{0.1}Ga_{0.9}B_{0.1}O_{3-z}$ (B is Mg or Co) and $Nd_{0.9}Ca_{0.1}Ga_{0.85}B_{0.15}O_{3-z}$ (B is Co) have been determined as a ratio of the measured value of an electromotive force/theoretical value by a method described in the examples (described later), in which an electromotive force of an oxygen concentration cell is measured. The results are shown in FIG. 2.

Figure 2:
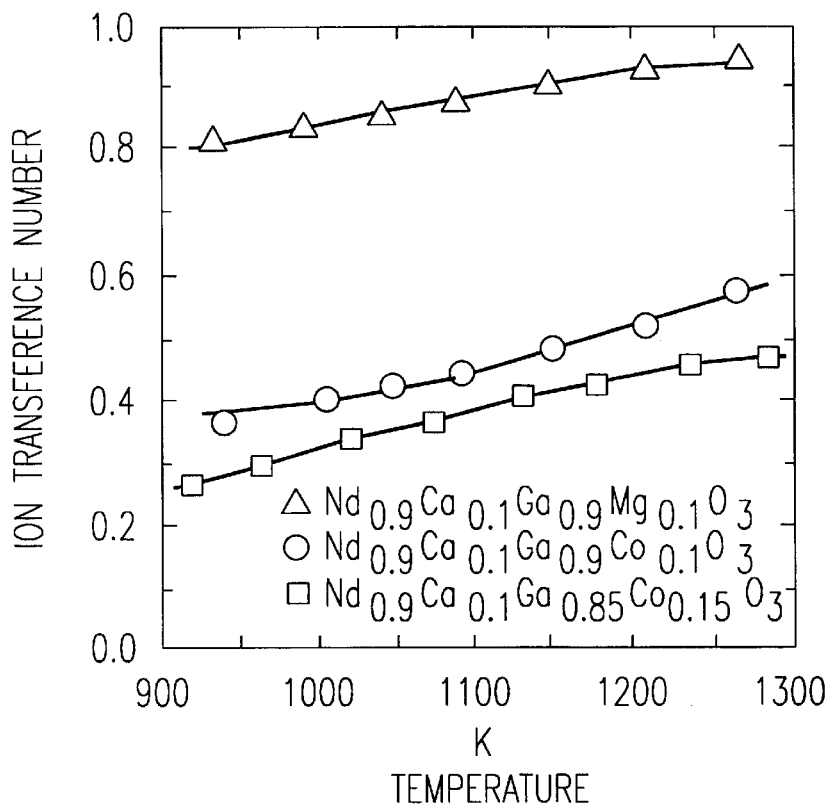
FIG. 2 is a graph showing temperature vs. ion transference numbers of the oxide ion mixed conductive substances of the present invention and similar materials.

As shown in FIG. 2, the ion transference numbers decrease slightly as the temperature is reduced. However, in the material in which the B atoms are Mg, the ion transference number is always 0.8 or more, and the ionic conduction predominates (i.e., it is an oxide ion conductive substance), which is compatible with the results of FIG. 1 indicating an ionic conductive substance in which the electric conductivity is reduced as the temperature is lowered.

On the other hand, the materials according to the present invention in which the B atoms are Co have an ion transference number always remaining at about 0.5 (a range of about 0.25 to 0.6) and shows an ideal electron-ion mixed conductivity in which ionic conduction is always comparable to electronic conduction, even if the temperature is changed. It is apparent from this graph that in these materials, both ionic conduction and electronic conduction contribute to the electric conductivities thereof and they are oxide ion mixed conductive substances.

Figure 3:
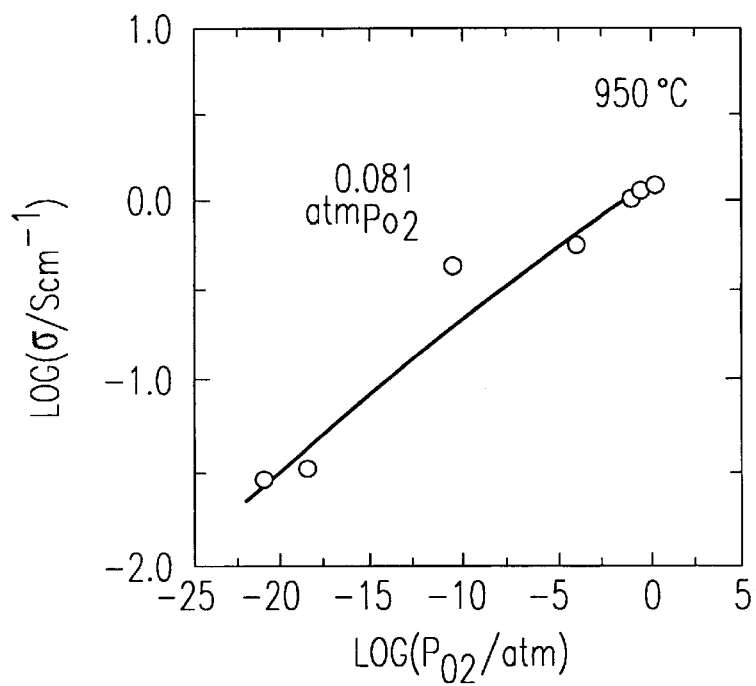
FIG. 3 is a graph showing oxygen partial pressure vs. electric conductivity of the oxide ion mixed conductive substance of the present invention, which was determined at 950° C.

The change in electric conductivity caused by changes in the oxygen partial pressure at 950° C. in the quaternary compound oxide material $Nd_{0.9}Ca_{0.1}Ga_{0.9}Co_{0.1}O_{3-z}$, according to the present invention, and the results thereof are, shown in FIG. 3. The conductivity of this material is reduced as the oxygen partial pressure is lowered. However, only a small change of 1/40 in the conductivity is observed when the oxygen partial pressure changes from an oxidative atmosphere of 1 atmospheric pressure (log $PO_2$=0) to a reductive atmosphere of $10^{-20}$ atmospheric pressure or less. This graph indicates that the electronic conduction of this oxide material not only results from positive hole transport but also from a large contribution of ionic conduction caused by oxide ion transport.

The electric conductivity is reduced by a reduction in the oxygen partial pressure, because electronic conduction brought about by positive holes is reduced as the oxygen partial pressure is reduced. Accordingly, the lower the oxygen partial pressure, the larger the ionic conduction becomes, and in contrast with this, the greater the oxygen partial pressure, the more the electronic conduction increases.

Both electronic conduction brought about by positive hole transport and ionic conduction brought about by oxide ion transport contribute to the electric conductivity of the perovskite type quaternary compound oxide material of the present invention, to almost the same extent. Both of these conductivities are large, and therefore a very high electric conductivity is provided, as shown in FIG. 1. As shown in FIG. 2, this mixed conductivity is exhibited over a wide temperature range. Accordingly, this material is an excellent oxide ion mixed conductive substance.

Figure 4A:
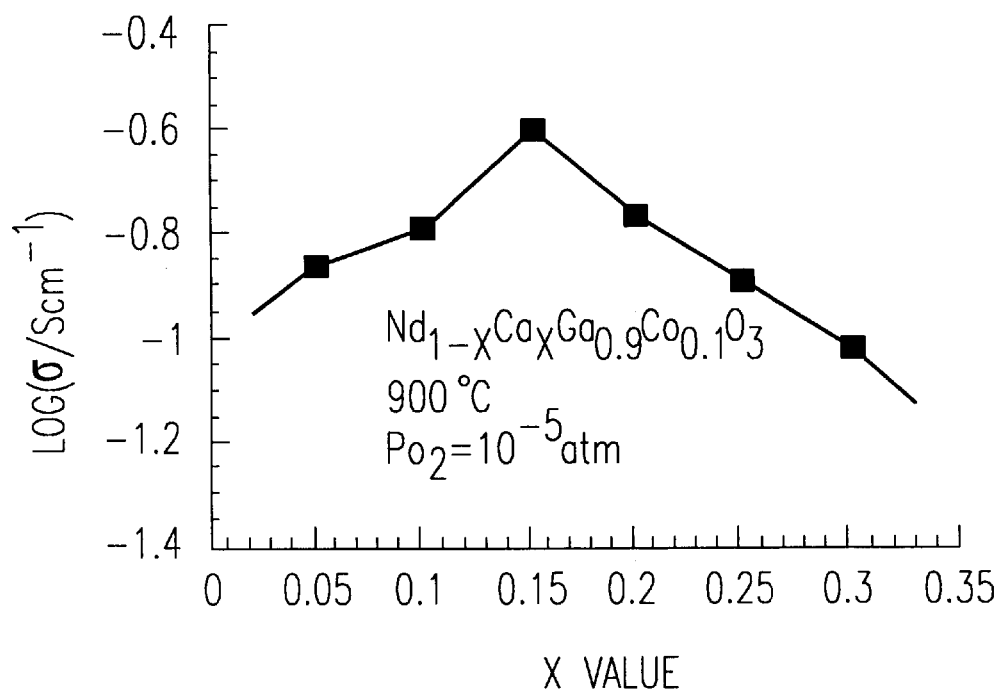
FIG. 4(a) and 4(b) are graphs showing the relation between the atomic ratio (x value) of Ca, which is an A site dopant, in the oxide ion mixed conductive substance of the present invention, and the electric conductivity (900° C., $PO_2=10^{-5}$ atm) (a) and the ion transference number (900° C.) (b).
Figure 4B:
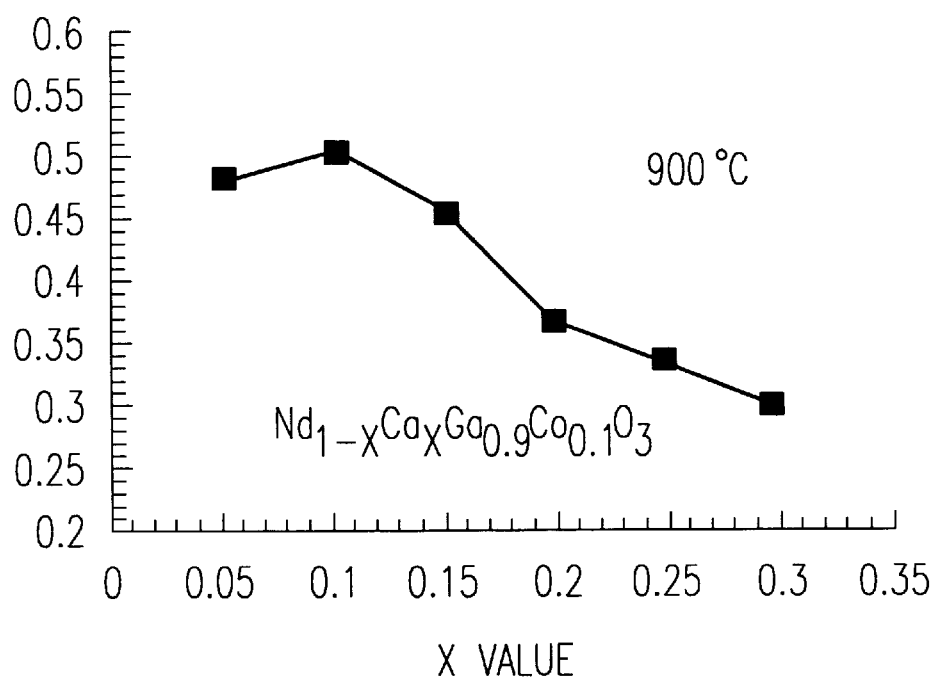

If the atomic ratio of doping atoms at each site, that is, the atomic ratio (x) of Ca atoms at the A site or the atomic ratio (y) of B atoms at the B site, falls outside the range described above, the electric conductivity or ion transference number of the quaternary compound oxide of the present invention is reduced. FIG. 4(a) shows the change in the electric conductivity observed when the atomic ratio (x) of Ca in $Nd_{1-x}Ca_xGa_{0.9}Co_{0.1}O_{3-z}$ is changed. As illustrated, if the atomic ratio (x) of Ca deviates from the range of 0.05 to 0.3 (an atomic ratio of the A atoms is 0.7 to 0.95), the conductivity is reduced. The ion transference number falls within a range of 0.3–0.5 for a Ca atomic ratio of from 0.05 to 0.3, as illustrated in FIG. 4(b).

Figure 5A:
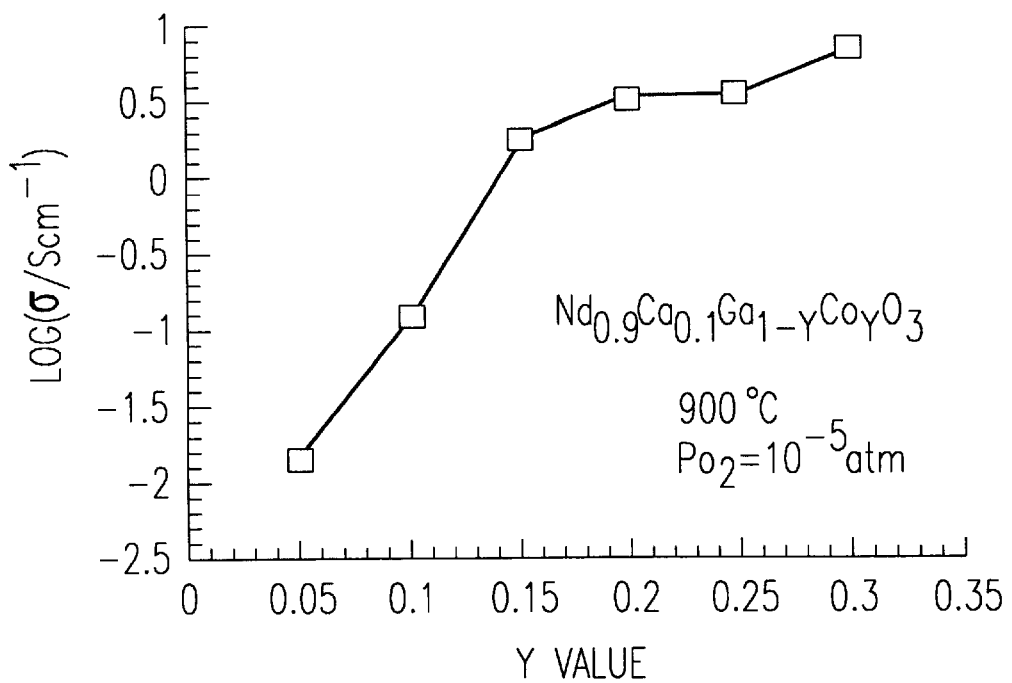
FIG. 5(a) and 5(b) are graphs showing the relation between the atomic ratio (y value) of Co, which is a B site dopant, in the oxide ion mixed conductive substance of the present invention, and the electric conductivity (900° C., $PO_2=10^{-5}$ atm) (a) and the ion transference number, at various temperatures (b).
Figure 5B:
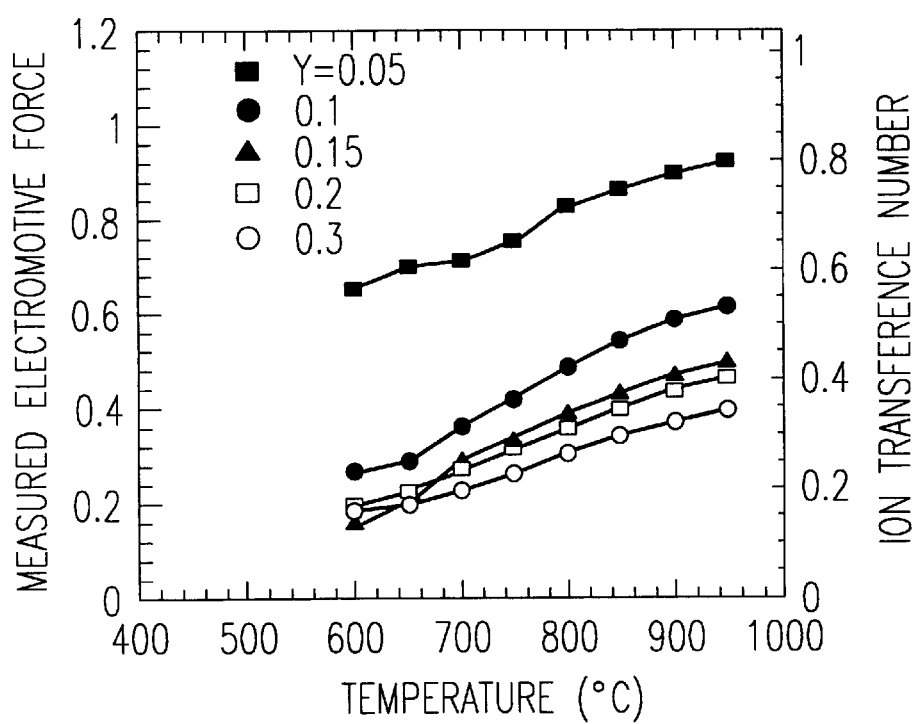

FIG. 5(a) shows the change in the electric conductivity observed when an atomic ratio (y) of Co (B atoms) in $Nd_{0.9}Ca_{0.1}Ga_{1-y}Co_yO_{3-z}$ is changed, and FIG. 5(b) shows the temperature dependence of the ion transference number for $Nd_{0.9}Ca_{0.1}Ga_{1-y}Co_yO_{3-z}$ (y=0.05–0.3). The electric conductivity increases as the atomic ratio (y) of Co increases from 0.05 to 0.3, as shown in FIG. 5(a), but the ion transference number decreases as y increases. Especially in the temperature range below 600° C., the ion transference number becomes smaller than 0.1 when y exceeds 0.3.

In the formula described above, the preferred composition in which the particularly high oxide ion mixed conductivity is obtained is as follows:

A=Nd, Pr, Sm or a mixture thereof, preferably Nd,
B=Co,
x=0.05 to 0.2, and
y=0.08 to 0.2.

The oxide ion mixed conductive substance of the present invention can be produced by molding a mixture of well mixed powders of the respective oxides of the component elements, in the prescribed compounding proportion; by any suitable means, and then sintering the molded article. In addition to the oxides, precursors (for example, carbonates, carboxylates, nitrates, etc.) which thermally decompose or oxidize during heating to form oxides, may be used as well. For sintering, a temperature of 1 100° C. or greater, preferably 1200° C. or greater, and a heating time period of several hours to some ten hours may be used. In order to shorten the heating time period, the raw material mixture may be pre-heated at a lower temperature than the sintering temperature. This pre-heating may be carried out by heating at 500 to 1200° C. for 1 to 10 hours. The pre-heated mixture is pulverized, if necessary, and then molded and finally sintered. Suitable powder molding means, such as uniaxial compression molding, isostatic pressing, extrusion molding and tape casting may be employed. The atmosphere used for heating, including pre-heating, is preferably an oxidative atmosphere of air, or an inert gas atmosphere.

The oxide ion mixed conductive substance of the present invention is useful as a material for electrodes, particularly as an air electrode (cathode) of a solid oxide (solid electrolyte) fuel cell (SOFC). In this case, other elements of the fuel cell, i.e., materials for the electrolyte and the fuel electrode (anode) are not specifically restricted. For example, stabilized zirconia, which is commonly used, particularly yttria-stabilized zirconia (YSZ) may be used as the electrolyte. Cermets, such as Ni-YSZ and Ni-CeO$_2$, as well as Ni metal, may be used as the fuel electrode.

In a SOFC using the oxide ion mixed conductive substance of the present invention as the air electrode, the preferred electrolyte material is an oxide ion conductive substance comprising a perovskite type compound oxide represented by the following formula (b):

$$Ln_{1-x'}A_{x'}Ga_{1-y'-z'}B1_{y'}B2_{z'}O_{3-w'} \qquad (b)$$

wherein Ln is at least one of La, Ce, Pr, Nd and Sm; A is at least one of Sr, Ca and Ba; B1 is at least one of Mg, Al and In; B2 is at least one of Co, Fe, Ni and Cu; x' is 0.05 to 0.3; y' is 0.025 to 0.29; z' is 0.01 to 0.15; y'+z'≦0.3, and w' corresponds to the number of oxide holes. This material may also be referred to as $Ln_{1-x'}A_{x'}Ga_{1-y-z'}B1_{y'}B2_{z'}$ oxide.

This compound oxide also has a perovskite type crystal structure corresponding to a composition of lanthanoid-gallate as is the case of the quaternary compound oxide represented by the formula (a) according to the present invention. The compound oxide represented by the formula (b) contains two types of doping elements, B1 and B2, at the B site.

The effect of temperature on the conductivity depends on the type of B2 element, and therefore the B2 element may be selected according to the operating temperature of the SOFC. For example, when turbine generation by exhaust gas is carried out at the same time as co-generation, a high operating temperature of about 1000° C. is preferred, and therefore a five-element compound oxide in which the B2 atoms are Co or Fe, preferably Co, and which shows high ionic conduction at this high temperature, is preferably used for the electrolyte. On the other hand, if the operating temperature is about 800° C., the material in which the B2 atoms are Ni may be used as well, in addition to the material described above. Furthermore, if the operating temperature is 600° C. or lower, a material in which the B2 atoms are Cu may be used as well.

The voltage generated by a SOFC is reduced to a large extent by resistance losses of the electrolyte, and a thinner membrane provides a higher output. Accordingly, YSZ as an electrolyte, is used in the form of a thin membrane of 30 to 50 $\mu$m. However, the oxide ion conductivity of YSZ is still small, and therefore the YSZ must be heated to about 1000° C. in order to obtain satisfactory performance. It is reported that a thin film of YSZ having a film thickness of 30 $\mu$m provides a practical output density of about 0.35 W/cm$^2$ at an operating temperature of 1000° C. Reported is an experimental example using a YSZ thin film which is as thin as a few $\mu$m to about 10 $\mu$m, in order to produce a cell output which is higher, or allow an operating temperature which is lower, than the above level. However, such a thin film makes the required gas impermeability of the electrolyte uncertain, and is not preferred in terms of reliability.

The preceding five-element compound oxide represented by the formula (b) shows a markedly higher oxide ion conductivity than that of YSZ in a wide temperature range, and therefore even when a SOFC is composed of an electrolyte providing film thickness produced by sintering methods, such as 0.5 mm (=500 $\mu$m), the output is greater than that provided by the YSZ thin film described above. In this case, the maximum output density, though varied depending on the type and the atomic ratio of the B2 atoms, exceeds that of a SOFC using a YSZ thin film having a thickness of 30 $\mu$m, even at an operating temperature of 1000° C., and becomes several times larger (for example, three times or greater) at an operating temperature of 800° C. Furthermore, if the electrolyte is thicker, the mechanical strength and the durability of the fuel cell are improved to a large extent. Or, if an electrolyte comprising the preceding five-element compound oxide is used with a film thickness of about 200 $\mu$m, the same output density as that displayed by a YSZ film having a thickness of 30 $\mu$m at 1000° C. can be obtained at low temperatures of 600 to 700° C.

The oxide ion conductive substance represented by formula (b) has a wide temperature range in which high oxide ion conductivity is shown, and therefore can broaden the operating temperature of the SOFC. For example, when turbine generation with exhaust gas is carried out by co-generation at the same time, a high operating temperature of about 1000° C. is preferred. However, generation by steam or other exhaust gases may be carried out at the same time even at a low operating temperature of, for example, 600 to 700° C., and therefore the generation efficiency of the SOFC is not much reduced. If the operating temperature is lowered an advantage is that steel materials, such as stainless steel, may be used for component materials of the SOFC and the material costs are notably reduced as compared with using materials such as a Ni-Cr alloy and ceramics necessary for operating temperatures of about 1000° C. It has been impossible to produce an SOFC from conventional YSZ which is capable of operating at such low temperatures, but according to the present invention, a SOFC capable of operating at such low temperatures, as well as high temperatures, is produced.

If an electrolyte is composed of the five-element compound oxide represented by the formula (b), both the electrolyte and the air electrode will be composed of the same type of material belonging to the same lanthanoid-gallate based perovskite type oxide. In contrast, conventional SOFCs, the electrolytes and the air electrodes are composed of different types of materials. For example, in a conventional SOFC the electrolyte is composed of YSZ, and the air electrode is composed of La(Sr)CoO$_3$. In this case, from a microscopic point of view at the atomic level, a very thin interfacial layer produced by reaction of the materials for the electrolyte and the air electrode is formed at an interface between both layers, and the output is reduced due to a voltage loss caused by the interfacial resistance. An interfacial resistance may be reduced by using an electrolyte and an air electrode formed from the same type of material, even if an interfacial layer is formed.

In addition to the problem of interfacial resistance, when the electrolyte and the air electrode are composed of different types of materials, the thermal expansion coefficients of both are, in general, different, and therefore large thermal stresses result from raising and lowering the temperature. This problem is also notably reduced by using an electrolyte and an air electrode formed from the same type of material.

The interfacial resistance and thermal stress described above can further be controlled by providing at least one intermediate layer having a composition which lies between those of the electrolyte and the air electrode, to allow the composition to change gradually from the electrolyte to the air electrode.

The preferred material of the fuel electrode comprises (1) Ni and (2) a compound represented by the formula $Ce_{1-m}C_mO_{2-z}$ (wherein C represents at least one of Sm, Gd, Y and Ca, m is 0.05 to 0.4, and z corresponds to the number of oxide holes). This material may also be referred to as $Ce_{1-m}C_m$ oxide. A proportion of both falls preferably in a range of 95:5 to 20:80 in terms of a volume ratio of (1):(2). More preferably, the m value is 0.1 to 0.3, and a volume ratio of (1):(2) is 90:10 to 40:60.

The structure of the SOFC is not specifically restricted and may be either a cylinder type or a planar type. In the case of a planar type, it may be either a stack type or a co-sintered type (monolithic type). In either case, a laminate of three layers obtained by interposing the electrolyte layer between the air electrode and the fuel electrode (the electrolyte lay contacts the air electrode on one face and the fuel electrode on the other face) is a fundamental cell structure. The electrolyte layer is gas-impermeable, and the respective layers of the air electrode and the fuel electrode are porous so that gas may pass through them. In the case of a cylinder type, fuel gas (for example, hydrogen) and air (or oxygen)

are fed separately into an internal part and an external part of the cylinder, and a number of cylinder type cells are connected via interconnectors disposed on a part of an external surface thereof. In the case of the planar type, gas is supplied by making use of an approximately planar type interconnector in which flow passages are provided so that fuel gas and air can separately be supplied. This interconnector is placed on the planar type cell comprising the three layer-laminated structure described above, one after another, to form a multilayer.

One reaction which becomes rate-determining in an electrode reaction of the SOFC is ionization of oxygen in the air electrode represented by the following equation:

$$\tfrac{1}{2}O_2 + 2e^- \rightarrow O^{2-}$$

This reaction takes place at an interface between the air electrode, the electrolyte and air, and therefore the larger the area of this interface, the larger the amount of reaction. Accordingly, it has so far been tried to turn the three layer structure described above into, for example, a corrugated form instead of a simple planar form.

Figure 6:
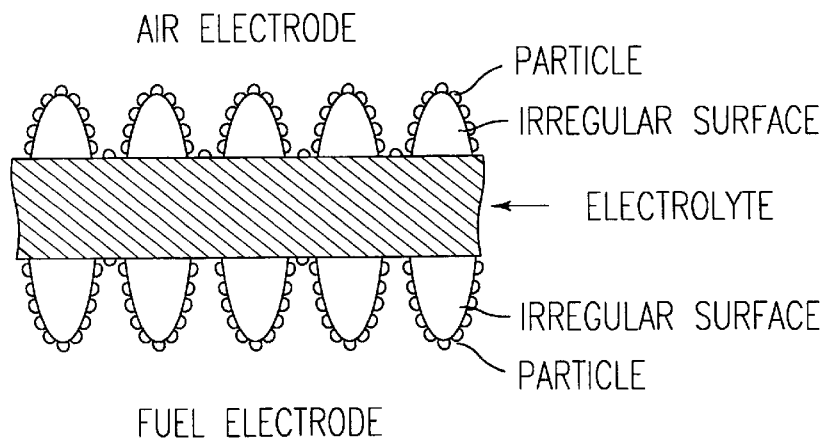
FIG. 6 is a schematic cross section showing a cell structure of a solid oxide fuel cell provided with surface irregularities.

In a suitable embodiment of the present invention, a cell structure is used, as shown in FIG. 6, in which irregularities are formed on both faces of the electrolyte layer and the material for the air electrode or the fuel electrode is adhered in the form of particles onto this irregular surface. In this case, a main part of the electrolyte layer must be gas-impermeable, but the irregular part formed on both surfaces may be porous. A material for this irregular part may be the same material as the electrolyte (that is, an oxide ion conductive substance) but is preferably a material showing mixed conductivity. For example, the irregular part provided on the air electrode side may be composed of the oxide ion mixed conductive material according to the present invention. In this case, the respective particles which adhered onto this irregular part are composed preferably of a material in which electronic conduction predominates, as is the case with conventional materials for an air electrode.

Such a structure may be formed by heating first mixed conductive substance particles onto the surface of the electrolyte layer and then further adhering and annealing finer electron-conductive substance particles on the surface thereof. Or, a similar structure may be obtained as well, in a fixed proportion, by simply adhering and annealing a mixture of mixed conductive substance particles and electron-conductive substance particles onto the surface of the electrolyte layer.

Figures 7A, 7B:
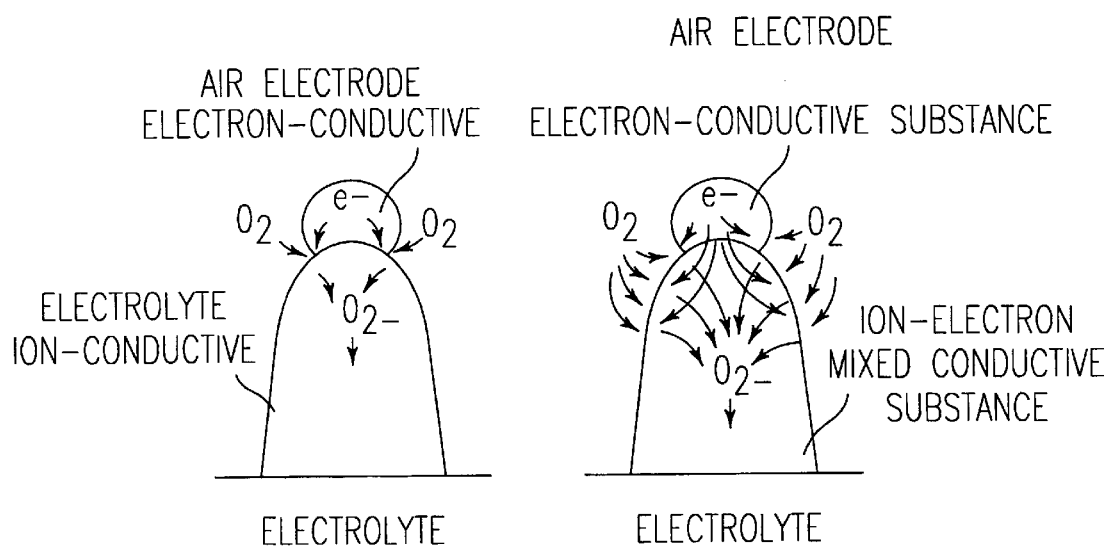
FIG. 7(a) and 7(b) are explanatory drawings showing the interface between an electrolyte layer and an air electrode in the cell structure described above.

A conventional material for an air electrode is an electron-conductive substance in which electronic conduction predominates (low ion transference number), such as La(Sr)CoO$_3$ and La(Sr)MnO$_3$, and therefore if oxygen in the air is ionized into oxide ions, the oxide ions cannot be transported into the electrolyte by passing through the air electrode material. Accordingly, when this air electrode material is used, the irregular surface on the air electrode side, shown in FIG. 6, is composed of the electrolyte material, and the air electrode material is adhered onto this irregular surface in the form of particles. In this case, ionization of oxygen takes place, as shown in FIG. 7(a), only at an interface between the three phases of the electrolyte layer, the air electrode particles and the air, that is, a one-dimensional area along the periphery (circumference) of a contact line between the surfaces of the electrolyte layer and the air electrode particles. As a result, polarization in the air electrode becomes large and the output of the SOFC decreases. Furthermore, since the electrolyte layer must continue to maintain contact with the air in order to take in oxide ions, the air electrode cannot completely cover the electrolyte layer, and the amount adhering is limited. Therefore, electric connection to an external terminal depending on electronic conduction of the air electrode is liable to become incomplete; or, in order to form a satisfactory electric connection, a cross-linking structure of a conductive material which roughly covers the three phase interface is required to connect the air electrode particles themselves and is rich in voids. In this case, the void structure is resistant to gas transport.

In contrast with this, the material for the air electrode according to the present invention shows an ion-electron mixed conductivity, and therefore this material itself can ionize oxygen in the air into oxide ions. The irregular surface on the air electrode side shown in FIG. 6 may be composed of the oxide ion mixed conductive substance of the present invention, and the respective particles which adhere to this irregular part may be composed of an air electrode material of conventional electron-conductive substances. In this case, ionization takes place, as shown in FIG. 7(b), at the interface of two phases of the irregular surface of the mixed conductive material and the air, that is, the two-dimensional area of the whole external surface of this material. Accordingly, the ionization efficiency grows extraordinarily large, and polarization of the air electrode can be prevented, so that the output of the SOFC increases. The oxide ions produced by the ionization are transported to the electrolyte through the air electrode material by virtue of the oxide ion conductivity of this mixed conductive air electrode material. Furthermore, the oxide ion mixed conductive substance constituting this irregular surface may be electronically conductive and therefore allow electricity to run to an external terminal. To assist this, particles of an electron-conductive substance may be adhered onto the surface of the irregular part on the air electrode side.

The fuel electrode is preferably composed of Ni and a ceria based material (Ce$_{1-m}$C$_m$O$_{2-z}$). Also in this case, the ceria based material, which is an oxide ion mixed conductive substance, forms the irregular surface on the fuel electrode side, and the respective particles on the surface thereof are composed of Ni, which is an electron-conductive substance. This allows oxide ions to be delivered to H$_2$ in a two-dimensional area, as is the case with the air electrode described above, and also markedly improves the efficiency of the H$_2$O formation reaction.

The oxide ion mixed conductive substance of the present invention can also be used as a gas separation membrane. For example, when two gases, each having a different oxygen concentration, are in contact with opposite sides of a separation membrane comprising an oxide ion mixed conductive substance, a concentration gradient allows the oxide ions to move from a high concentration side to a low concentration side in the inside of the membrane, and at the same time, electrons flow in the opposite direction. As a result thereof, oxygen flows in one direction, and the membrane functions as an oxygen separation membrane. In the case of this gas separation membrane, if the electric conductivity is only an oxide ion conductivity, electrons which electrically compensate the flow of the oxide ions do not flow, so that the membrane does not function as an oxygen separation membrane. Accordingly, a material showing a mixed conductivity, having electronic conduction to some extent in addition to oxide ion conduction, is required.

The oxide ion mixed conductive substance of the present invention is high in both oxide ion conductivity and electronic conductivity and therefore increases in the flow of oxygen per unit area when used as a gas separation membrane. Accordingly, the oxygen separation efficiency is improved. Furthermore, the oxide ion mixed conductivity is exhibited even at temperatures of 600° C. or lower, and therefore the operating cost is significantly reduced.

This gas separation membrane can be used not only for separating oxygen, but also decomposing, for example, water and $NO_x$. Water is decomposed into oxygen ions and hydrogen on the surface of the separation membrane, so that a difference between the oxygen concentrations produced on both sides of the membrane is the driving force to form a stream of oxide ions. Hydrogen remains without flowing, and therefore hydrogen is produced from the water. In the case of $NO_x$, $NO_x$ is harmlessly decomposed and separated into nitrogen and oxygen.

EXAMPLES

Having generally described this invention, a further understanding can be obtained by reference to certain specific examples which are provided herein for purposes of illustration only and are not intended to be limiting unless otherwise specified.

Example 1

Respective powders of $Nd_2O_3$, $CaCO_3$, $Ga_2O_3$ and CoO (all having a purity of 99% or more) were blended in proportions to give $Nd_{0.9}Ca_{0.1}Ga_{0.9}Co_{0.1}O_{3-z}$ and sufficiently mixed, followed by pre-heating the mixture at 1000° C. for 6 hours. This pre-heated mixture was pulverized and compression-molded into a disc having a thickness of 0.5 mm and a diameter of 15 mm by isostatic pressing. Then, the molded article was heated at 1400° C. for 6 hours for sintering. The crystal structure of the resulting sintered article was investigated by X-ray diffraction and found to be a perovskite type crystal structure. Other phases were not observed.

The electric conductivity of the resulting $Nd_{0.9}Ca_{0.1}Ga_{0.9}Co_{0.1}O_{3-z}$ simtered article was determined by applying platinum paste which became an electrode on a rectangular parallelpiped sample cut out from the disc-shaped sintered article, then connecting a platinum wire and heating at 950–1200° C. for 10–60 minutes. The resistance was measured by a direct current four-terminal or alternating current two-terminal method in an apparatus having adjustable/oxygen partial pressures and temperatures. The oxygen partial pressure was adjusted using a mixed gas of $O_2$—$N_2$, CO—$CO_2$ and $H_2$—$H_2O$ and measured by means of a YSZ oxygen sensor.

The results of the measurement are shown in FIG. 1 and FIG. 2. Sintered articles of other perovskite type quaternary compound oxides shown in FIG. 1 were prepared in the same manner as described above. FIG. 1 shows the electric conductivities obtained when the temperatures were changed at a fixed oxygen partial pressure ($10^{-5}$ atm), and FIG. 3 shows the electric conductivities obtained when the oxygen partial pressure was changed at a fixed temperature (950° C.).

The ion transference number of the $Nd_{0.9}Ca_{0.1}Ga_{0.9}Co_{0.1}O_{3-z}$ sintered article described above was determined in terms of a ratio of the measured value of electromotive force/theoretical value of electromotive force, wherein one side of the sample was partitioned into an oxygen atmosphere and the other into a hydrogen atmosphere, to prepare an $H_2$—$O_2$ cell (an oxygen concentration cell); the electromotive force of this cell was measured, and a theoretical electromotive force thereof was determined from the Nernst equation. The results of the measurements are shown in FIG. 2.

It is apparent from the results shown in FIG. 1 to FIG. 3 that the sintered articles of the compositions described above obtained in the examples of the invention are excellent oxide ion mixed conductive substances.

Example 2

Figure 8:
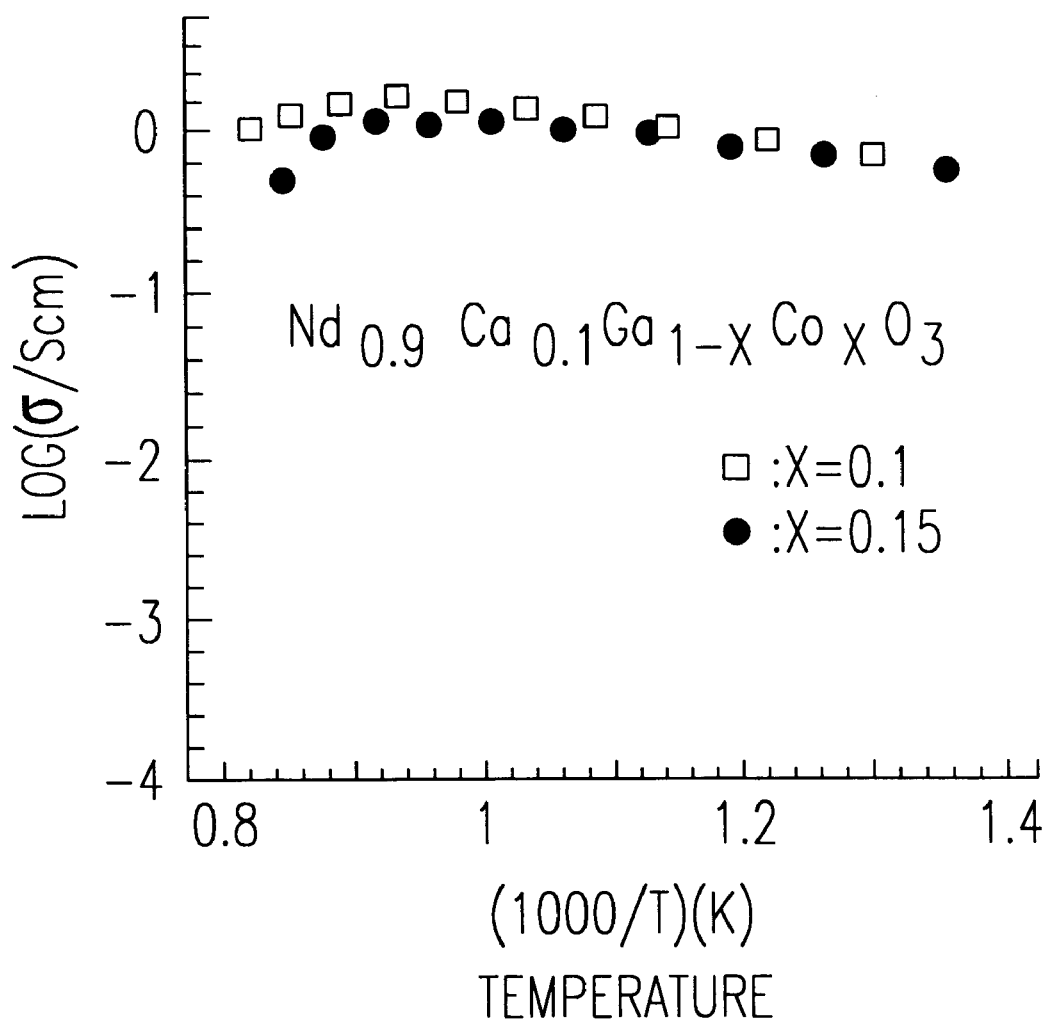
FIG. 8 is a graph showing temperature vs. electric conductivities of the oxide ion mixed conductive substances of the present invention.

An oxide ion mixed conductive substance comprising a $Nd_{0.9}Ca_{0.1}Ga_{0.85}Co_{0.15}O_{3-z}$ sintered article was prepared in the same manner as in Example 1. The temperature dependence (Arrehnius plot, oxygen partial pressure: $10^{-5}$ atm) of the electric conductivity of this compound oxide is shown in FIG. 8, together with the plot of the material prepared in Example 1. The electric conductivity was found to be higher than that of the material prepared in Example 1 at high temperatures and almost the same electric conductivity as that of the material prepared in Example 1 was found at low temperatures. The temperature dependence of the ion transference number of this material is shown in FIG. 2.

Example 3

Oxide ion mixed conductive substances having the composition of $Nd_{0.9}Ca_{0.1}Ga_{0.85}Co_{0.15}O_{3-z}$ and comprising sintered bodies in which metal atoms of A and B were varied were prepared in the same manner as in Example 1, and electric conductivities thereof were determined. The conductivities ($\sigma/S\ cm^{-1}$) observed at an oxygen partial pressure of $10^{-5}$ and 800° C. were as follows:

(1) $A_{0.9}Ca_{0.1}B_{0.1}O_{3-z}$
    A = Nd: 1.15
    = Pr: 1.06
    = Sm: 0.72
(2) $Nd_{0.9}Ca_{0.1}Ga_{0.9}Co_{0.2}O_{3-z}$
    B = Co: 1.15
    = Fe: 0.98
    = Ni: 0.97
    = Cu: 0.75

Example 4

Sintered articles of the oxide ion mixed conductive substances $Nd_{1-x}Ca_xGa_{0.9}Co_{0.1}O_{3-z}$ (where x=0.05, 0.1, 0.15, 0.2, 0.25 and 0.3) were prepared in the same manner as in Example 1. The electric conductivities of these compound oxides at 900° C. and oxygen partial pressure of $10^{-5}$ atm are shown in FIG. 4(a). The ion transference number of these compound oxides at 900° C. is shown in FIG. 4(b).

Example 5

Sintered articles of the oxide ion mixed conductive substances $Nd_{0.9}Ca_{0.1}Ga_{1-y}Co_yO_{3-z}$ (where y=0.05, 0.1, 0.15, 0.2, 0.25 and 0.3) were prepared in the same manner as in Example 1. The electric conductivities of these compound oxides at 900° C. and oxygen partial pressure of $10^{-5}$ atm are shown in FIG. 5(a). The temperature dependence of the ion transference number of these compound oxides at 900° C. is shown in FIG. 5(b).

The oxide ion mixed conductive substances according to the present invention show both electronic conduction brought about by positive hole transport and ionic conduction brought about by oxide ion transport, and have conduction characteristics which are ideal for an oxide ion mixed conductive substance. These materials always show a high electric conductivity over a wide temperature range extending from 600° C. or lower to 1000° C. or higher, without large variation and the ion transportation values always stays in the vicinity of 0.5 over this temperature range.

This oxide ion mixed conductive substance exhibits excellent electron-oxide ion mixed conductivity which has not previously been observed, as well as increased electronic conduction brought about by positive hole transport, particularly in an oxidative atmosphere. These substances are useful as an air electrode of a solid oxide fuel cell, whereby the fuel cell is improved in output characteristics. Furthermore, this material is also useful as a gas separation membrane such as an air separation membrane.

Obviously, numerous modifications and variations of the present invention are possible in light of the above teachings. It is therefore to be understood that within the scope of the appended claims, the invention may be practiced otherwise than as specifically described herein.

The priority documents of the present application, Japanese Patent Applications Hei 9-234839 and Hei 10-081184, filed Aug. 29, 1997 and Mar. 27, 1998, respectively, are hereby incorporated by reference.

What is claimed is:

1. An oxide ion mixed conductive substance of the formula of $A_{1-x}Ca_xGa_{1-y}B_y$ oxide, wherein A is at least one lanthanoid element having a trivalent octacoordinated ion radius of 1.05 to 1.15 Å, B is at least one element selected from the group consisting of Co, Fe, Ni and Cu, x is 0.05 to 0.3, y is 0.05 to 0.3, and said oxide ion mixed conductive substance has a perovskite structure.

2. The oxide ion mixed conductive substance of claim 1, wherein A is at least one element selected from the group consisting of Nd, Pr, Sm, Ce, Eu and Gd.

3. A solid oxide fuel cell, comprising:

(a) an air electrode, (b) an electrolyte, and (c) a fuel electrode, wherein said air electrode comprises the oxide ion mixed conductive substance of claim 2.

4. A gas separation membrane, comprising the oxide ion mixed conductive substance of claim 2.

5. The oxide ion mixed conductive substance of claim 1, wherein A is at least one element selected from the group consisting of Nd, Pr and Sm, B is Co, x is 0.05 to 0.2, and y is 0.08 to 0.2.

6. The oxide ion mixed conductive substance of claim 5, wherein A is Nd.

7. A solid oxide fuel cell, comprising:

(a) an air electrode, (b) an electrolyte, and (c) a fuel electrode, wherein said air electrode comprises the oxide ion mixed conductive substance of claim 6.

8. The solid oxide fuel cell of claim 7, wherein said electrolyte comprises an oxide ion conductive substance of the formula:

$$Ln_{1-x'}A_{x'}Ga_{1-y'-z'}B1_{y'}B2_{z'} \text{ oxide,}$$

wherein Ln is at least one element selected from the group consisting of La, Ce, Pr, Nd and Sm, A is at least one element selected from the group consisting of Sr, Ca and Ba, B1 is at least one element selected from the group consisting of Mg, Al and In, B2 is at least one element selected from the group consisting of Co, Fe, Ni and Cu, x' is 0.05 to 0.3, y' is 0.025 to 0.29, z' is 0.01 to 0.15, and y'+z'≦0.3.

9. The solid oxide fuel cell of claim 8, wherein said fuel electrode comprises:

(1) Ni, and (2) a compound of the formula of $Ce_{1-m}C_m$ oxide, wherein C at least one element selected from the group consisting of Sm, Gd, Y and Ca, and m is 0.05 to 0.4.

10. A method of making the solid oxide fuel cell of claim 9, comprising:

forming a laminate of said air electrode, said electrolyte and said fuel electrode, wherein said electrolyte is between said air electrode and said fuel electrode.

11. A method of generating electricity, comprising oxidizing a fuel in the solid oxide fuel cell of claim 9.

12. The solid oxide fuel cell of claim 7, wherein said fuel electrode comprises:

(1) Ni, and (2) a compound of the formula of $Ce_{1-m}C_m$ oxide, wherein C at least one element selected from the group consisting of Sm, Gd, Y and Ca, and m is 0.05 to 0.4.

13. A gas separation membrane, comprising the oxide ion mixed conductive substance of claim 6.

14. A method of making the oxide ion mixed conductive substance of claim 6, comprising:

sintering a mixture containing Nd, Ca, Ga and Co, to form said oxide ion mixed conductive substance.

15. A solid oxide fuel cell, comprising:

(a) an air electrode, (b) an electrolyte, and (c) a fuel electrode, wherein said air electrode comprises the oxide ion mixed conductive substance of claim 1.

16. The solid oxide fuel cell of claim 15, wherein said electrolyte comprises an oxide ion conductive substance of the formula:

$$Ln_{1-x'}A_{x'}Ga_{1-y'-z'}B1_{y'}B2_{z'} \text{ oxide,}$$

wherein Ln is at least one element selected from the group consisting of La, Ce, Pr, Nd and Sm, A is at least one element selected from the group consisting of Sr, Ca and Ba, B1 is at least one element selected from the group consisting of Mg, Al and In, B2 is at least one element selected from the group consisting of Co, Fe, Ni and Cu, x' is 0.05 to 0.3, y' is 0.025 to 0.29, z' is 0.01 to 0.15, and y'+z'≦0.3.

17. The solid oxide fuel cell of claim 16, wherein said fuel electrode comprises:

(1) Ni, and (2) a compound of the formula of $Ce_{1-m}C_m$ oxide, wherein C at least one element selected from the group consisting of Sm, Gd, Y and Ca, and m is 0.05 to 0.4.

18. A method of making the solid oxide fuel cell of claim 17, comprising:

forming a laminate of said air electrode, said electrolyte and said fuel electrode, wherein said electrolyte is between said air electrode and said fuel electrode.

19. A method of generating electricity, comprising oxidizing a fuel in the solid oxide fuel cell of claim 17.

20. The solid oxide fuel cell of claim 15, wherein said fuel electrode comprises:

(1) Ni, and (2) a compound of the formula of $Ce_{1-m}C_m$ oxide, wherein C at least one element selected from the group consisting of Sm, Gd, Y and Ca, and m is 0.05 to 0.4.

21. A method of generating electricity, comprising oxidizing a fuel in the solid oxide fuel cell of claim 15.

22. A method of making the solid oxide fuel cell of claim 15, comprising:

forming a laminate of said air electrode, said electrolyte and said fuel electrode, wherein said electrolyte is between said air electrode and said fuel electrode.

23. A gas separation membrane, comprising the oxide ion mixed conductive substance of claim 1.

24. A method of making the gas separation membrane of claim 23, comprising:

molding a mixture containing A, Ca, Ga and B, to form a molded article, and sintering said molded article, to form said gas separation membrane.

25. An air electrode for solid oxide fuel cell, comprising the oxide ion mixed conductive substance of claim 1.

26. A method of making the air electrode of claim 25, comprising:

molding a mixture containing A, Ca, Ga and B, to form a molded article, and sintering said molded article, to form said air electrode.

27. A method of making the oxide ion mixed conductive substance of claim 1, comprising:

sintering a mixture containing A, Ca, Ga and B, to form said oxide ion mixed conductive substance.

* * * * *